Aug. 12, 1952   E. R. GERBER   2,606,415
DISK HARROW CONSTRUCTION
Filed July 20, 1948
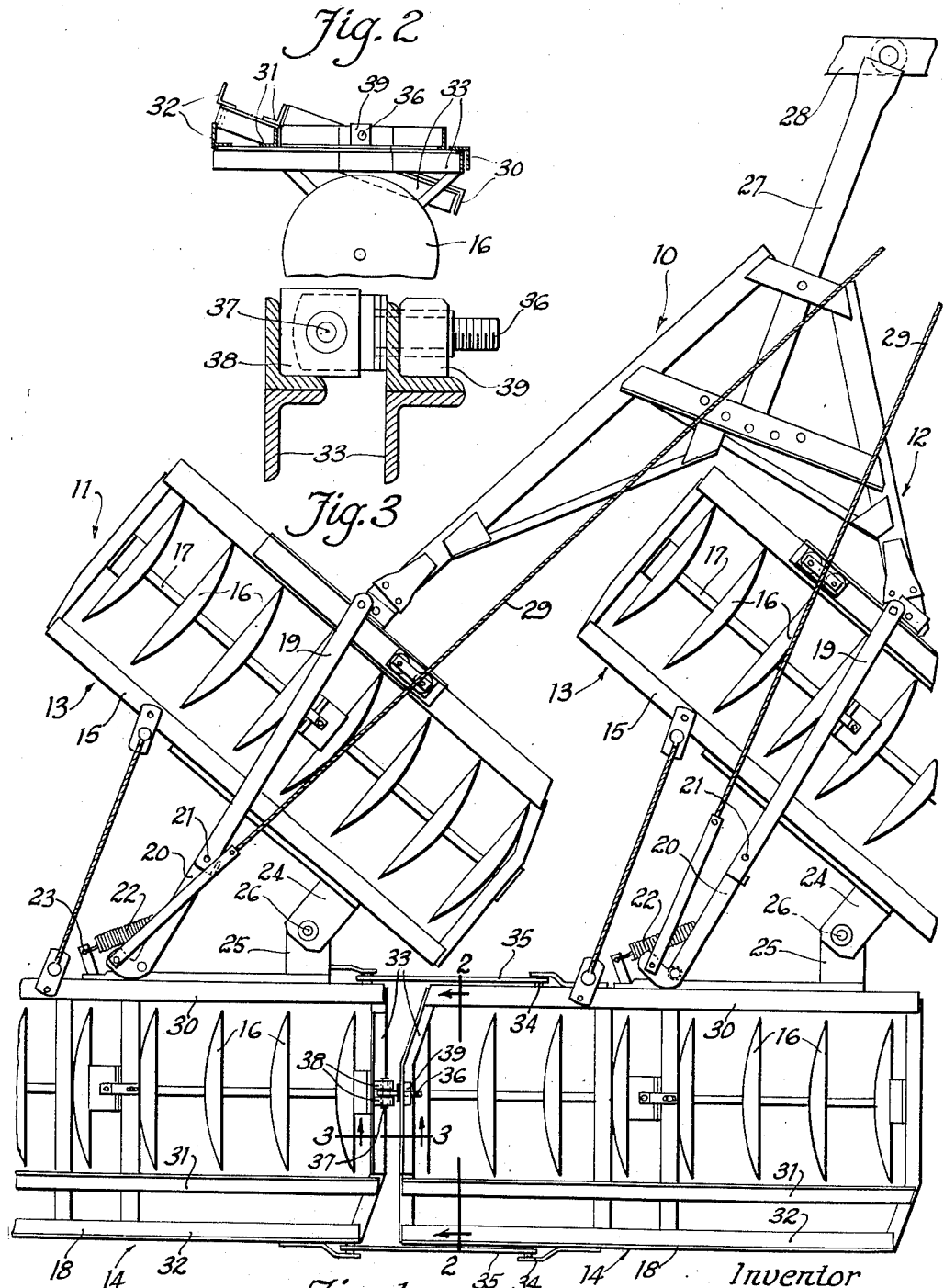
Inventor
Edward R. Gerber
Paul O. Pippel
Atty Patented Aug. 12, 1952

2,606,415

UNITED STATES PATENT OFFICE 2,606,415

DISK HARROW CONSTRUCTION

Edward R. Gerber, Stockton, Calif., assignor to International Harvester Company, a corporation of New Jersey Application July 20, 1948, Serial No. 39,755

6 Claims. (Cl. 55—83)

This invention relates to agricultural implements and particularly to harrows. More specifically the invention relates to a harrow construction in which pairs of disc harrows of the offset type are placed side by side in squadron formation and propelled by a single source of power. Such a squadron harrow is useful in tilling large acreages.

The arrangement of offset harrows in squadron formation is well known. It is customary to provide a unitary hitch frame for connection to each harrow. When operating individually an offset disc harrow comprises a front and a rear gang which are placed at an angle with respect to each other when in operation and which are brought into parallelism for transport. In some types of squadron harrows both units are allowed to maintain this relationship and in such case the front and rear gangs of each pair are in parallel relation to the front and rear gangs of the other harrow unit. An undesirable feature of this construction has been that a ridge of untilled earth is left between the harrow units. In order to avoid this it has been proposed to connect the rear gangs of each harrow unit in such a way that they are held in transverse alignment. In this way any ridge of untilled earth between the front gangs will be worked by the rear gangs. One method of connecting the rear gangs of the harrow units has been to provide pivoted links connecting the inner ends of the gangs which permitted one gang to rise and fall with respect to the other when changes in ground contour were encountered; however, this relative bodily movement of the rear gangs of the squadron harrow resulted in un-uniform tillage. An object of the present invention has, therefor, been to provide a squadron harrow construction wherein no ridge of untilled ground is left after the harrow has passed.

Another object of the invention is to provide an improved squadron harrow construction wherein the rear gangs are connected in such a way as to accommodate relative movement thereof in response to changes in ground contour.

Another object of the invention is to provide in a squadron harrow, connecting means between the rear gangs for holding them substantially in transverse alignment while accommodating relative angling in a vertical plane as well as turning of the gangs about a transverse axis to swing the discs in response to changes in surface contour.

Other objects and advantages of the invention will become clear from the following detailed description when read in conjunction with the accompanying drawings, wherein Fig. 1 is a plan view of a squadron harrow incorporating the features of the present invention;

Fig. 2 is a view taken on the line 2—2 of Fig. 1 showing the vertical spacing between the axis of the disks and the pivot axis of the gangs, and illustrating the relative rotation of the gangs; and Fig. 3 is an enlarged view taken on the line 3—3 of Fig. 1.

Referring to the drawing, a squadron harrow which is designated by the numeral 10, comprises respectively left-hand and right-hand offset harrow units 11 to 12. Harrow 11 includes a front gang 13 and a rear gang 14. The front gang 13 consists of a rectangular frame 15 which provides the support for a series of discs 16 rotatably mounted upon a shaft 17 which extends below the plane of the frame 15 in a manner conventional in harrows of this type. Front frame 15 is connected to frame 18 of the rear gang by a pair of links 19 and 20 pivoted together at 21 and forming a toggle. These links are held in alignment by a spring 22 anchored to the link 20 and to a lug 23 carried by the rear frame 18. Frames 15 and 18 are likewise connected by hinges 24 and 25 which are pivoted together at 26.

The right-hand harrow unit 12 is a substantial duplicate of the left-hand unit 11 and like numerals designate like parts thereof. The harrow is provided with a triangular hitch frame 27 which is pivotally connected by a ball and socket joint to the front gang of each unit and is likewise connected to the drawbar 28 of a vehicle such as a tractor.

The toggles comprising the links 19 and 20 are broken to permit the front gangs 13 to resume positions in parallelism with the rear gangs 14 for transport purposes by mechanism including a cable or chain 29 connected to an extension upon link 20 at one end, and at its other end to the drawbar 28, in a manner not shown, at a location laterally spaced from the point of connection of the hitch frame 27 thereto. Turning of the tractor as at the end of a field places strain upon the cable 29 to break the toggles and permit the front gangs to come into transverse alignment for transport purposes.

As pointed out before, the angular disposition of the rear gangs in a horizontal plane is undesirable, difficulties such as the formation of ridges which have not been tilled being the result. Likewise, considering the size of the implement and its great width, it is desirable that sufficient flexibility be provided for the rear gangs to take care of variations in surface contour. It is therefore desirable that the discs of one gang be allowed to move vertically to some extent with respect to the other gang of discs while maintaining the gangs in alignment in a transverse plane.

Each rear frame 18 comprises a front rail 30, rear rails 31 and 32 and end connecting bars 33. Front rail 30 and rear rail 32 are provided with longitudinally projecting pins 34 adapted to receive the apertured ends of straps 35 which are preferably oversize to allow play for the pins but may, if desired, be in the form of vertically extending slots, or in the form of ball and socket joints.

The adjacent end bars 33 of the gangs 14 are connected to provide relative pivoting of the gangs about longitudinal and transverse axes by means comprising an eye bolt 36, pivotally mounted upon a pin 37 carried by lugs 38, secured to one of the end bars 33. The other bar 33 of the adjacent disc gang frame is apertured to receive the shank of the bolt 36. The bolt 36 is held against displacement with respect to the end bars 33 by the provision of a threaded block 39 adapted to receive the threaded end of the bolt 36. By virtue of this connection the rear gangs 14 are capable of relative pivoting about pin 37 as an axis to permit the ends of the gangs to rise and fall in a vertical plane. Furthermore, twisting of one gang with respect to the other about a transverse axis parallel to and above the axis of the discs is provided as indicated in Fig. 2 to permit the gangs to follow the variations in ground contour.

From the foregoing description it should be clear that a novel harrow construction has been provided wherein pairs of offset disc harrows are placed in side-by-side relation, provided with a unitary hitch, and so connected as to operate as a unitary implement. It should likewise be understood that the invention has been described in its preferred embodiment and that modifications may be made therein without departing from the spirit of the invention or the scope of the appended claims.

What is claimed is:

1. In an offset harrow including laterally spaced pairs of front and rear disk gangs, the front and rear disk gangs of each pair being connected together for relative movement of the front gang about a vertical axis between angularly related and transversely aligned positions with respect to the front gang of the other pair, draft means connected to the front gangs, connecting means between the inner ends of said rear gangs for maintaining the axes of the disks substantially in alignment, and a transverse pivotal connection between said rear gangs vertically spaced from the axis of the disks to accommodate relative rotation of the gangs about a transverse axis.

2. In an offset harrow including laterally spaced pairs of front and rear disk gangs, the front and rear disk gangs of each pair being connected together for relative movement of the front gang about a vertical axis between angularly related and transversely aligned positions with respect to the front gang of the other pair, draft means connected to the front gangs, connecting means between the inner ends of said rear gangs for maintaining the axes of the disks substantially in alignment, said connecting means including means accommodating relative rotation of the gangs about a transverse axis.

3. In an offset harrow including laterally spaced pairs of front and rear disk gangs, the front and rear disk gangs of each pair being connected together for relative movement of the front gang about a vertical axis between angularly related and transversely aligned positions with respect to the front gang of the other pair, draft means connected to the front gangs, connecting means between the inner ends of said rear gangs comprising a transverse pivot member adapted to accommodate swinging of one gang with respect to the other about an axis spaced from the axis of the disks and means for maintaining the gangs substantially in transverse alignment.

4. In a harrow comprising a pair of laterally spaced gangs, each including a frame and a plurality of disks carried by the frame for rotation on a transverse axis, connecting means between the inner ends of said frames adapted to prevent relative angling of the gangs about a vertical axis, but to accommodate relative movement of the gangs about a transverse axis parallel to and spaced from the axis of the disks.

5. In a harrow comprising a pair of laterally spaced gangs, each including a frame and a plurality of disks carried by the frame for rotation on a transverse axis, connecting means between the inner ends of said frames adapted to prevent relative angling of the gangs about a vertical axis but to accommodate relative movement of the gangs about transverse and longitudinal axes.

6. In an offset harrow including laterally spaced pairs of front and rear disk gangs, the front and rear disk gangs of each pair being connected together for relative movement of the front gang about a vertical axis between angularly related and transversely aligned positions with respect to the front gang of the other pair, draft means connected to the front gangs, connecting means between the inner ends of said rear gangs for maintaining the axis of the disks substantially in alignment, including an eye-bolt pivotally mounted on one of said gangs on a longitudinal axis, said eye-bolt having a shank extending transversely of the harrow parallel to the axis of the disk and pivotally connected to the other said frame to accommodate rotation thereof about a transverse axis relative to the other frame.

EDWARD R. GERBER.

REFERENCES CITED

The following references are of record in the file of this patent:

UNITED STATES PATENTS

| Number | Name | Date |
|---|---|---|
| 2,230,041 | Lindgren et al. | Jan. 28, 1941 |
| 2,274,767 | Zink et al. | Mar. 3, 1942 |
| 2,385,637 | Mitchell et al. | Sept. 25, 1945 |